Figure 1:
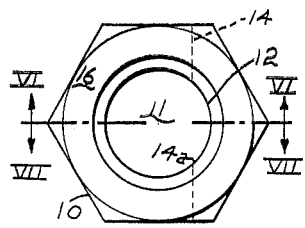

July 26, 1966 C. H. HANFLAND 3,262,481
SELF-LOCKING SLOTTED NUT WITH DEFORMED THREAD PORTION
Filed Dec. 17, 1964 2 Sheets-Sheet 1

INVENTOR
CURT H. HANFLAND
By Walter Buky

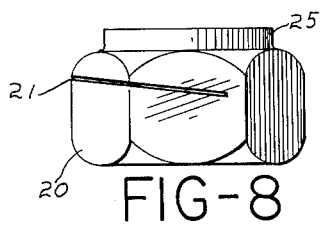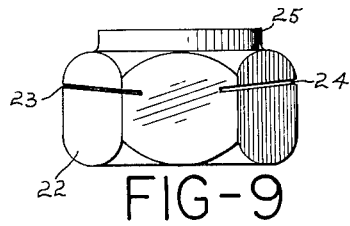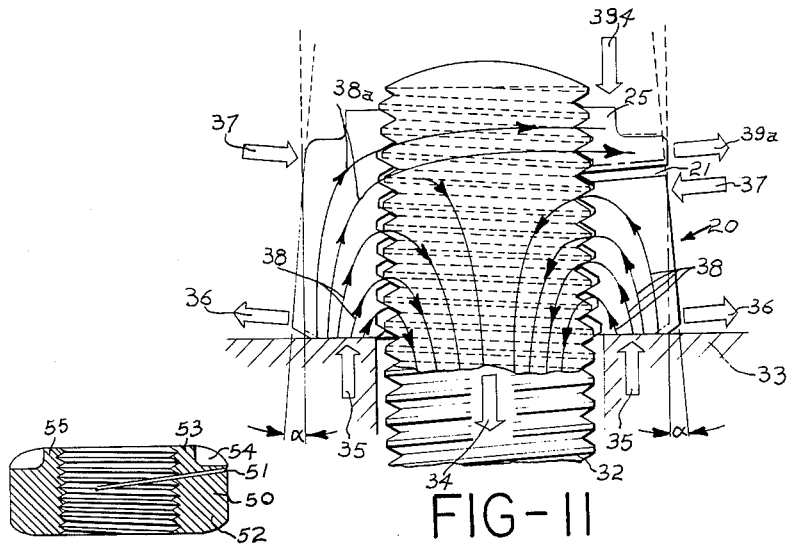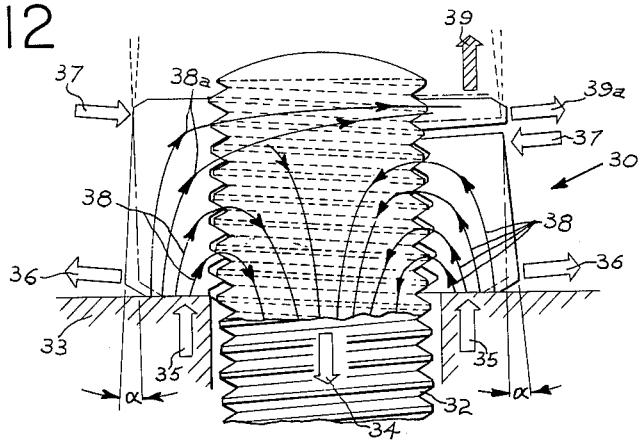

United States Patent Office 3,262,481
Patented July 26, 1966

---

3,262,481
SELF-LOCKING SLOTTED NUT WITH DEFORMED THREAD PORTION
Curt H. Hanfland, Laustrasse 62, Stuttgart-Sonnenberg 7, Germany
Filed Dec. 17, 1964, Ser. No. 419,043
6 Claims. (Cl. 151—21)

This invention relates to the lock nuts and is particularly concerned with a one piece self-locking nut.

This application is a continuation-in-part application of U.S. patent application Ser. No. 134,607 filed August 29, 1961, and of U.S. patent application Ser. No. 200,683 filed June 7, 1962, both now abandoned.

One piece self-locking nuts are known and take various forms including those in which the nut is a single integral piece of metal and is modified as to configuration in such a manner that it will grip a threaded member, such as a stud or bolt, on which it is threaded.

Lock nuts of this nature are generally made by providing the nut with one or more slots or notches or grooves therein extending into the threaded part of the nut and forming a region on the body of the nut that can be deformed relative to the main portion of the body of the nut so that either radial or axial stresses, or both, will be developed within the nut when it is screwed on a threaded member which will cause the nut lockingly to grip the threaded member.

Such nuts are of an advantage because they are, as mentioned, of one piece construction and are, therefore economical to make and simple to use. No extra elements such as loose lock washers or jam nuts are required, as are employed in connection with conventional plain nuts for locking, and no plastic inserts or the like are required, as are employed with lock nuts of another known type and in which the plastic insert grips the thread of the threaded member.

While one piece lock nuts of the type in which the nut has a slot formed therein are generally known, heretofore nuts of this type have been defective for one reason or the other. For example, if the slot is disposed in such a manner that it intersects the entire threaded bore of the nut, there may be a material weakening of the nut that detracts from its holding power.

If the slot is too far from the end of the nut, the nut is weakened and must be made to greater dimensions to have sufficient strength.

Still further, if the slot is disposed too close to one end of the nut, the locking power of the nut on a threaded member is reduced.

The present invention is based on a particular location and arrangement of a transverse slot in a substantially conventional nut structure, and on the treatment of the nut after slotting. The slot is so positioned and arranged in the nut body that the strength of the nut is not materially reduced and so that substantially all of the threads in the nut are effective for imparting holding power to the nut. The nut body, after slotting, is upset in a particular manner to produce the locking effect.

A particular object of the present invention, therefore, is the provision of a one piece lock nut of improved construction and with improved holding power.

A still further object of this invention is the provision of an improved one piece lock nut which is quite simple and inexpensive to manufacture and which can have the same dimensions as a standard plain nut.

A still further object of this invention is the provision of a one piece lock nut having a transverse slot therein in which the slot is so positioned as to interfere to the smallest degree with the holding efficiency of the threads in the nut.

A still further object of this invention is the provision of an improved one piece lock nut in which substantially a conventional nut body can be converted into a locking nut according to the present invention by the provision of a single saw slot simply cut into the nut body in a predetermined position followed by a simple deforming of the nut body.

Figure 2:
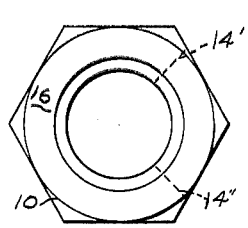
Figure 3:
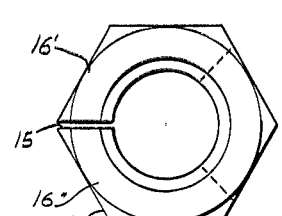
Figures 4, 5:
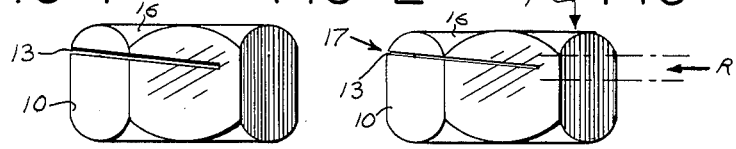
Figure 6:
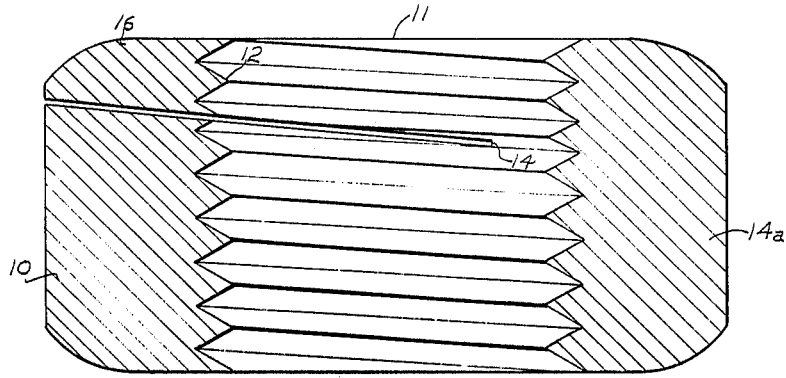
Figure 7:
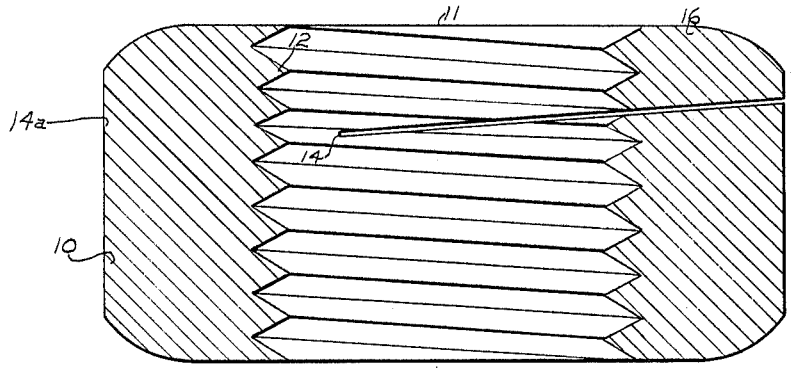

These and other objects and advantages of this invention will become more apparent upon reference to the following specification taken in connection with the accompanying drawings, in which:

FIGURE 1 is a plan view of a nut embodying the present invention;
FIGURE 2 is a plan view of a modification;
FIGURE 3 is a plan view of another modification;
FIGURE 4 is a side view of the nut looking in from the bottom of FIGURE 1;
FIGURE 5 is a side view like FIGURE 4 but showing the nut body after upsetting in accordance with the present invention;
FIGURE 6 is a sectional view indicated by line VI—VI of FIGURE 1;
FIGURE 7 is a sectional view taken on line VII—VII of FIGURE 1 looking in the opposite direction from FIGURE 6;
FIGURE 8 is a view like FIGURE 5 but showing another modification;
FIGURE 9 is a view like FIGURE 8 but shows how two slots could be formed in a nut body;
FIGURE 10 is a sectional view of the FIGURE 5 modification showing the forces developed in the nut body during locking;
FIGURE 11 is a sectional view like FIGURE 10 but showing the forces developed in the nut body of the modification of FIGURE 8; and
FIGURE 12 shows a modification.

Referring to the drawing somewhat more in detail, and, in particular to FIGURES 1–7, the nut body is indicated at 10 and may comprise a substantially conventional nut body, for example, a hexagonal nut body having a central bore 11 in which is provided threads 12.

According to the present invention, the nut body is provided with a substantially transversely extending saw slot 13 which extends from one side of the body into but not completely through the body. As will be seen in FIGURE 1, slot 13 terminates along a line 14 extending laterally of the body and positioned between the central axis of bore 11 and the side thereof opposite the beginning end of the slot. The stopping of the slot along line 14 insures that over a region 14a, about 90° of the periphery of the bore in FIGURE 1, the threads of the nut will be uninterrupted from the top of the nut body to the bottom. In FIGURE 2, the bottom end of the slot is angular, ending along line 14' and 14" and leaving a portion of the thread of the nut uninterrupted.

As will be seen in FIGURE 3, the portion of the nut body above the slot 13 can be divided by a slot 15 if desired. Without slot 15, slot 13 will form a single spring member 16 on the end of the nut and with slot 15, two spring members 16' and 16" are formed. In all cases, spring means are formed on the nut body near the top cantilevered on the nut body by an uncut region of the nut body lying beyond the innermost end, or ends, of the saw slot.

Still further, slot 13 is inclined relative to the axis of bore 11 at an angle substantially corresponding with the angle of inclination of threads 12 in the nut body on one side of the nut body. This will be seen in FIGURES 4–7 wherein slot 13 will be seen to have substantially the same angular inclination as the thread 12 along which it extends. The slot 13 can follow either the root or the peak of the thread or be disposed therebetween but, in every case, the slot, on one side of the nut, will be inclined substantially at the pitch angle of the threads as will be seen in FIGURE 6.

The slot, on the other side of the nut, as seen in FIGURE 7 intersects the threads at an angle because the angle of inclination of the slot is opposite to the pitch angle of the threads on that particular side of the nut.

The locking characteristic of the nut comes about in part because of the contraction that takes place at the upper end of the nut when it is tightened down against a surface and body by deformation of the spring means formed on the nut body by the saw slot and which is that part of the nut which is positioned above slot 13. In FIGURES 1 and 2 the spring means is denoted 16 while in FIGURE 3, the spring means is denoted 16' and 16".

As to the contracting of the upper end of the nut, this comes about because of the force exerted on the nut when it is tightened up on a threaded member against a surface. This effect is well-known in the art and, with a lock nut according to the present invention, will result in the side of the nut where the threads are uninterrupted being urged over toward the axis of the nut into binding engagement with the threads of the threaded member. The slot 13 permits this to occur because no counteracting forces can be developed in the nut body above slot 13 except on the side of the nut body which contains the uninterrupted threads. FIGURES 10 and 11, to be described more fully hereinafter, show the forces referred to.

On the other hand, the spring means of the nut may be formed downwardly at least at the outer free end thereof and may even be welded to the nut body at 17. As will be seen in FIGURES 6 and 7, the threads in the nut body above slot 13 do not align exactly with the threads below slot 13, and, therefore, when nut 10 is run down on a threaded member there will be developed an axial clamping force on the threaded member and in the nut when the threaded member commences to thread through the spring means portion of the nut body.

The force referred to causes the nut to grip the threaded member tightly and thereby provides a locking effect. The two locking effects referred to above provide for the nut to grip the threaded member tightly so that it can be loosened only by the use of a wrench and the application of substantial force.

The substantially uninterrupted threads extending completely through the nut make it possible to form the nut body to smaller dimensions than would be the case if the slot were larger or consisted of a multiplicity of slots, or if portion of threads were cut away as is the case with some lock nuts. The nut body can, in fact, be of conventional dimensions for standard plain nuts.

The relatively thin saw slot according to the present invention, permits substantially all of the threads of the nut to contribute to the holding power of the nut and even the small spring means portion of the nut body that establishes the locking effect of the nut contributes materially to the holding power of the nut.

The nut according to the present invention can thus be made quickly and economically and has improved locking power that will be exhibited repeatedly even though the nut is removed from the threaded member and replaced on the threaded member a number of times.

The fact that the threads are substantially continuous from end to end of the nut body, being interrupted, at most, by only a relatively narrow slot and including a portion that is entirely uninterrupted, contributes materially to the efficiency of the lock nut according to the present invention. The threads of the threaded member are easily led into the threads of the smaller portion of the nut body above the slot and this feature inhibits undue wearing of the threads of the threaded member or of the nut.

It will be apparent that the smaller portion of the nut body, namely, the spring means portion, between the slot and the adjacent end of the nut body can be referred to as a "spring means" or a "spring member" because it is the resilience of this portion of the nut body which gives the nut its locking characteristics. Even when the spring means or spring member is welded to the nut body adjacent the outer commencing end of the slot the resilience of the spring means or spring member is still relied upon to give the nut its locking characteristics.

It is, of course, possible to deform the spring member or spring means in a radial direction, also to produce a radial gripping force on the threaded member, but in practice it has been found that results superior to those of other one piece lock nuts can be obtained merely by slotting the nut body as disclosed and deforming the thus formed relatively thin spring member at the end of the nut toward the main portion of the nut body.

It will be understood that the slot in the nut body is disposed near the end of the nut body which can be referred to as the "top" and which is that end of the nut body opposite the end of the nut body which engages a surface when the nut is threaded on a threaded member, such as a bolt or a stud.

With respect to the development of the locking actions in a nut according to the present invention, I have found that, after slotting the nut body, as shown in FIGURE 4, the spring portion of the nut body, which is that part of the nut body above the slot, can advantageously be moved downwardly in parallelism with itself by the application of an upsetting force indicated by the arrow F in FIGURE 5. The application of the upsetting force will cause deformation of the nut body in the region indicated at R which may be confined almost completely to the portion of the nut body coextensive with the slot or it may include a region of the nut body extending beyond the slot on both sides in the axial direction of the nut body.

In any case, I have found that the upsetting operation referred to, and which can be carried out quite simply, produces greatly superior locking results so that a locking nut according to the present invention can be formed inexpensively and quickly.

Furthermore, due to the fact that substantially the entire strength of the material of the nut body is realized, the nut body can be the same size dimensionally as conventional nut bodies, thereby permitting the locking nut according to the present invention to be employed without requiring greater space for its use.

The modifications disclosed and described in FIGURES 1 through 7 show only a single slot in the nut body nut it will be apparent that two slots or even more could be formed in the nut body extending into intersecting relation with the threaded bore in the nut body, and then, following upsetting, the locking characteristics referred to would be obtained.

A modification of the body is disclosed in FIGURES 8 and 9, wherein a nut body 20 in FIGURE 8 is provided with a single slot means 21, whereas the nut body 22 in FIGURE 9 is provided with two slot means 23 and 24. FIGURE 9 thus illustrates a double slot arrangement that could be employed in connection with any of the nut bodies previously described.

The particular characteristic of the nut body of FIGURES 8 and 9 is the upstanding control collar 25 formed thereon which is a reduced diameter cyclindrical extension projecting upwardly above the top of the nut body and receiving 1½ or 2 threads.

This control collar is influential with respect to the locking effect of the nut and, furthermore, contributes strength to the entire nut body.

With regard to the action which takes place when a nut according to the present invention is tightened down on a stud, reference may be had to FIGURES 10 and 11.

FIGURE 10 shows a nut body according to the first described modification and it will be seen that the nut body, indicated at 30 in FIGURE 10 is threaded on a bolt or stud 32 and tightened up against a member 33.

The stud exerts a force designated by arrow 34 and which is equal and opposite to the force exerted by member 33 on the nut body. This last mentioned force being represented by the arrows 35. When the nut is tightened down on the member the nut tends to expand at the bottom as indicated by the arrows 36 thereon, while the top of the nut tends to contract as indicated by the arrows 37.

The net result is that the side walls of the nut are tilted inwardly by an angle indicated on the drawings.

The forces exerted upwardly on he body of the nut body are transmitted therethrough into the stud as indicated by the arrows 38. It will be observed that the two arrows 38a at the extreme left do not turn backwardly into the stud but tend to thrust the nut body laterally. This comes about because the lines of force of these arrows is in the region of the free end of the spring portion and thus tend to thrust this free end laterally and to produce one of the locking effects described. The tendency for the spring portion to move laterally is indicated by arrow 39a.

In FIGURE 10 it will also be noted that the free end of the spring has been moved upwardly as indicated by arrow 39 which also represents a locking force.

It will further be appreciated that clearances between the bore of the nut body and the stud are readily compensated for in accordance with this invention so that nuts can be freely run onto studs or bolts until the spring portion of the nut commences to thread on the stud, at which time rotation of the nut will be continued by a wrench. The nut will exhibit uniform resistance to movement when being run on a stud or bolt and when being removed therefrom except when the bolt bottoms against the member 33.

With respect to FIGURE 11, substantially the same conditions exist and the same reference numerals have been employed but the control collar portion on top of the spring member becomes influential for controlling the locking effect of the nut. In other respects the same locking action is had as was described in connection with FIGURE 10.

FIGURE 12 is a fragmentary view showing how the control collar portion of the lock nut can be established by forming an annular recess about the spring member portion of the nut.

In FIGURE 12, the nut body 50 has the slot 51 formed therein and which slot has been substantially closed by the upsetting operating, previously described. The slot divxides the nut body into a lower main part 42 and into an upper resilient wedge shaped spring member portion 53. Around the top spring member portion 53 there is formed the annular groove or recess 54 which defines on top of the spring member portion the control collar 55.

In the making of the nut, according to the present invention, the thickness of the slot or slots, before upsetting, is not particularly critical but will always be less than the lead of the thread and will always be greater than the maximum tolerance between the threads in the nut and the threads on the member on which the nut is threaded.

In most instances, a single slot provides the required locking action, but two or more slots may be provided. The slots in every case following, at least in part, the pitch angle of the threads in the bore of the nut. In the upsetting operation, as mentioned, the spring member portion of the nut body, whether this consists of a single spring member or multiple spring members, is displaced in parallelism itself toward the main portion of the nut body until the slot is substantially closed. The region of the nut body that is not interrupted by any slot is that portion thereof which is upset, although the upsetting action may extend axially beyond this particular region in the nut body.

Conventional nuts can be converted into locking nuts by the practice of the present invention merely by slotting and upsetting the nut as described. When the nuts are to be heat treated, it is advantageous to effect the upsetting while the nut body is hot, and at which time the said upsetting can easily be accomplished.

While the slot means has been described as being positioned between the center of the nut and one end, namely, the upper end, it has been found of an advantage to locate the slot within the range of the upper third of the height of the nut and in most instances, within the range of the upper fourth of the nut.

It will be understood that this invention is susceptible to modification in order to adapt it to different usages and conditions; and accordingly, it is desired to comprehend such modifications within this invention as may fall within the scope of the appended claims.

What is claimed is:

1. In a lock nut; a nut body having a threaded bore extendiing axially therethrough from the top end to the bottom end of the body, slot means in the nut body extending transversely therein from at least one side and intersecting a portion only of said threaded bore so as to leave a part of the threads in said bore uninterrupted from end to end of the nut body, said slot means being located between the middle of the nut body and one end of the body, said nut body and the threads therein at the inner end of said slot being upset so that the one portion of said body on one side of said slot means is displaced in parallelism with itself in the axial direction of the said body toward the other portion of the body so that the threads therein do not form a true continuation of the threads in the said other portion of said body and so that said slot is substantially closed, said slot means having at least a substantial portion thereof inclined at the same angle as the threads in said bore, said slot means comprising a single slot extending into said nut body from one side extending to beyond the axis of the bore in the nut body and terminating short of the wall of the bore on the other side of the nut body.

2. In a lock nut as defined in claim 1; said nut having an integral collar portion of reduced diameter on the free end beyond said slot means, the axial extent of said collar being at least as great as the pitch of said threads.

3. In a lock nut as defined in claim 1; said nut having an axial slit through its free end to intersect said slot means equidistant from its ends and form equal spring members on opposite sides of said slit.

4. In a lock nut; a nut body having a threaded bore extending axially therethrough from the top end to the bottom end of the body, slot means in the nut body extending transversely therein from at least one side and intersecting a portion only of said threaded bore so as to leave a part of the threads in said bore uninterrupted from end to end of the nut body, said slot means being located between the middle of the nut body and one end of the body, the said body and the threads therein between the terminals of said slot means being upset so as substantially to close said slot means, the portion of said body being thereby displaced toward each other in parallelism with themselves so that the threads in the portion of the body on one axial side of the slot means do not form a true continuation of the threads in the other portion of said body, said slot means having at least a substantial portion thereof inclined at the same angle as the threads in said bore, said slot means comprising a single slot extending into said nut body from one side extending to beyond the axis of the bore in the nut body and terminating short of the wall of the bore in the nut body and terminating short of the wall of the bore on the other side of the nut body, the terminal ends of said slot lying in one and the same straight line.

5. In a lock nut; a nut body having a threaded bore extending axially therethrough from the top end to the bottom end of the body, slot means in the nut body extending transversely therein from at least one side and intersecting a portion only of said threaded bore so as to leave a part of the threads in said bore uninterrupted from end to end of the nut body, said slot means being located between the middle of the nut body and one end of the body, the said body and the threads therein between the terminals of said slot means being upset so as substantially to close said slot means, the portion of said body being thereby displaced toward each other in parallelism with themselves so that the threads in the portion of the body on one axial side of the slot means do not form a true continuation of the threads in the other portion of said body, said slot means having at least a substantial portion thereof inclined at the same angle as the threads in said bore, said slot means comprising a single slot extending into said nut body from one side extending to beyond the axis of the bore in the nut body and terminating short of the wall of the bore on the other side of the nut body, the terminal ends of said slot lying in respective lines disposed at an angle to each other and extending generally radially of the nut body.

6. In a lock nut; a nut body having a threaded bore extending axially therethrough from the top end to the bottom end of the body, a plurality of circumferentially spaced slot means extending transversely therein from the periphery of said nut body and extending circumferentially about the greater part of the periphery of said nut body and intersecting a portion of said threaded bore so as to leave parts of the threads of lesser circumferential extent than said slot means uninterrupted from end to end of the nut body between said slot means, said slot means being located between the middle and one end of the nut body and equidistant from said one end, each of said slot means having at least a substantial portion thereof inclined at substantially the same angle as the threads in said bore, said slot means dividing the nut body into a larger main portion and smaller spring portion means, said spring portion means forming a circumferentially continuous annulus, said nut body being plastically deformed in the region of said uninterrupted parts of said thread so as to displace said spring portion means in parallelism with itself in the axial direction of the bore in said nut body toward said main portion of the nut body, said uninterrupted parts of said threads and said nut body being upset such an amount that said slot means is substantially closed.

References Cited by the Examiner

UNITED STATES PATENTS

| | | | |
|---|---|---|---|
| 609,144 | 8/1898 | Goddin | 151—21 |
| 1,113,419 | 10/1914 | Dollman | 151—21 |
| 2,142,820 | 1/1939 | Olson | 151—21 |
| 2,367,259 | 1/1945 | Beach | 151—21 |

FOREIGN PATENTS

| | | |
|---|---|---|
| 326,050 | 3/1930 | Great Britain. |
| 443,045 | 2/1936 | Great Britain. |
| 551,534 | 2/1943 | Great Britain. |

EDWARD C. ALLEN, *Primary Examiner.*